Patented Sept. 8, 1936

2,053,708

UNITED STATES PATENT OFFICE 2,053,708

PREPARATION OF REACTION PRODUCTS OF ALKYLENE OXIDES AND ALCOHOLS

Harvey R. Fife, Pittsburgh, Pa., assignor, by mesne assignments, to Union Carbide and Carbon Corporation, a corporation of New York No Drawing. Application September 5, 1934, Serial No. 742,765

17 Claims. (Cl. 260—151)

This invention relates to improvements in the preparation of the chemical compounds formed by the reaction of alkylene oxides with monohydroxy alcohols, polyhydroxy alcohols, or derivatives of these alcohols. It has particular reference to new catalyst materials for promoting such reactions.

A variety of products may be formed by this type of reaction, and these in general may be termed hydroxy ether compounds, since they contain in their molecular structure one or more hydroxyl groups, as well as an ether linkage. Especially typical of these chemicals are many glycol derivatives such as the monoalkyl ethers of alkylene and polyalkylene glycols, the former of which may be derived from the reaction of alkylene oxides with monohydric alcohols, and the polyglycol ethers can be formed by a further reaction of an oxide on the simpler glycol ethers. The polyglycols in themselves may also be considered as hydroxy ether compounds, and can likewise be prepared by an alkylene oxide reaction. Glycerine derivatives, and reaction products of phenols and aromatic alcohols, as well as the aliphatic alcohols, may also be included within this group. It is with the preparation of this general class of materials, as formed from an alkylene oxide reactant, that the present invention is directly concerned.

Heretofore, reactions with alkylene oxides have ordinarily been carried out in an autoclave, under considerable pressure and at elevated temperatures. Ethylene oxide or propylene oxide, for example, has been found to react fairly rapidly with an alcohol, to form a monoalkyl ether of ethylene or propylene glycol respectively, at a temperature of about 140° C. to 180° C. At this high temperature, however, considerable difficulty is encountered in maintaining control of the reaction speed, which tends to become excessive to a point where the pressures built up are sufficient to cause danger of explosion, unless very high-pressure apparatus is used. In an effort to avoid these dangerous operating conditions, catalysts have been proposed to promote the reaction at a lower temperature. Materials such as small amounts of inorganic acids, or easily decomposed salts, such as mercury sulphates and chlorides, have shown activity in this respect, but at the same time their presence after completion of the reaction is quite undesirable. This is due to the fact that they again become active and promote side reactions during distillation and recovery of the pure product from the crude reaction mixture. In preparing the higher boiling compounds, such as the alkyl ether of four to eight carbon atom polyglycols, or higher derivatives, this fault is especially noticeable, as the temperatures necessary to fractionally distil the pure ether from the crude product often rises above 150° C. to 160° C. At these temperatures the above-mentioned catalysts tend to cause a decomposition leading to the formation of ring compounds, such as dialkylene oxides and acetals, and the action increases as a higher distillation temperature becomes necessary. This decomposition not only causes a reduction in the final yield, but the materials formed are highly objectionable as contaminants in the pure ether product.

It is an object of my invention to avoid the aforementioned difficulties, commonly encountered in reacting alkylene oxides with alcohols or their derivatives, and in accordance therewith I have provided a process for producing hydroxy ether compounds, in which reactions of this type may be efficiently carried out at low temperatures, and fractional distillation of the reaction mixture may be effected without danger of forming decomposition materials which may contaminate the pure final product.

The invention consists essentially in conducting the alkylene oxide reaction in the presence of a catalyst material consisting of an organic amine. The organic aliphatic amines generally have been found to exert a catalytic activity, and to promote a rapid reaction to hydroxy ether compounds at low temperatures. Included among these are the simple straight-chain alkylamines, such as methylamine, ethylamine, diethylamine, etc., and the hydroxyalkyl amines, especially such as the various ethanol amines. The primary amines appear to be somewhat more active than the others, and are preferred for this reason, although all of a large number tested exhibited a certain degree of catalyst activity. It is also of advantage to use an amine, which aside from catalyzing the main reaction, will also react with some of the alkylene oxide to form high-boiling products, which will remain as still residue in the final fractionation. This will insure a finished product free from catalyst contamination. Monoethanolamine has been found most desirable in its catalytic action, and has no observed tendency to contaminate the pure hydroxy ether product.

The following examples are illustrative of the invention:

*Example 1*

A mixture of 2460 grams (18 moles) of diethylene glycol monoethyl ether, 35 grams (8 moles) of ethylene oxide, and 15 grams of monoethanolamine was charged into a two gallon autoclave. The reaction started very shortly after heat was applied to the sealed autoclave, proceeded rapidly at temperatures between 50° C. and 60° C., and was completed in a period of about four hours. The highest temperature reached during the reaction was 63° C., and at no time did the pressure developed exceed 40 pounds per square inch gauge, dropping off from this point as the reaction approached completion. Fractional distillation of the crude reaction product gave a yield of the monoethyl ether of triethylene and tetraethylene glycol showing approximately an 80% conversion of the ethylene oxide in the original charge. A very small fraction of the remaining oxide further reacted to give compounds of sufficiently high boiling point so as to remain in the still residue. No catalyst contamination, or compounds of decomposition were found in the pure final product.

*Example 2*

In a manner substantially similar to the above example, benzyl alcohol was reacted with ethylene oxide. A two gallon autoclave was charged with 4320 grams of benzyl alcohol, 880 grams of ethylene oxide, and 15 c. c. of monoethanolamine. In four runs the average temperature of the reaction was about 50° C., at which temperature the pressure varied from an initial one of about 28 pounds per square inch gage to a final pressure of 10 pounds. The average time required for completion of the reaction was 26 hours. Upon fractional distillation of the reaction mixture, a pure product of ethylene glycol monobenzyl ether was obtained, showing a yield of about 75%, based on the charge of ethylene oxide.

At the low reaction temperatures permissible with my new catalysts, the reaction is not only readily controlled, but goes to completion without danger of building up excessive pressures. The low temperature also tends to eliminate large amounts of high-boiling residues, without resorting to the alternative heretofore used for this purpose, of employing excessive quantities of the alcohol or alcohol derivative reactant.

It will be understood that the most favorable conditions for any reaction may vary with the nature of the particular reactants, but in all instances temperatures lower than those heretofore required, with a resulting reduction in operating pressures, are permissible, with the assurance of an efficient conversion to the desired product. Monoethanolamine, as shown by the examples, is a preferred catalyst material, but the other amines mentioned exhibit a similar catalyst activity, and are included within the invention, which is applicable generally to promote the formation of hydroxy ether compounds derived from an alkylene oxide reaction.

I claim:

1. The process which comprises reacting a member of the group consisting of monohydroxy alcohols and polyhydroxy alcohols, with an alkylene oxide, in the presence of an organic aliphatic amine as a catalyst.

2. The process which comprises reacting a member of the group consisting of monohydroxy alcohols and polyhydroxy alcohols, with an alkylene oxide, in the presence of an organic aliphatic amine as a catalyst, said amine being also capable of reaction with the alkylene oxide to form higher boiling compounds than the essential product.

3. The process which comprises reacting a member of the group consisting of monohydroxy alcohols and polyhydroxy alcohols, with an alkylene oxide, in the presence of an organic aliphatic primary amine as a catalyst, said amine being also capable of reaction with the alkylene oxide to form higher boiling compounds than the essential product.

4. The process which comprises reacting a member of the group consisting of monohydroxy alcohols and polyhydroxy alcohols, with an alkylene oxide, in the presence of an ethanolamine as a catalyst.

5. The process which comprises reacting a member of the group consisting of monohydroxy alcohols and polyhydroxy alcohols, with an alkylene oxide, in the presence of monoethanolamine as a catalyst.

6. The process which comprises reacting an alcohol with an alkylene oxide in the presence of an organic aliphatic amine as a catalyst, said amine being also capable of reaction with the alkylene oxide to form higher boiling compounds than the essential product.

7. The process which comprises reacting an alcohol with an alkylene oxide, in the presence of an organic aliphatic primary amine as a catalyst, said amine being also capable of reaction with the alkylene oxide to form higher boiling compounds than the essential product.

8. The process which comprises reacting an alcohol with an alkylene oxide, in the presence of an ethanolamine as a catalyst.

9. The process which comprises reacting an alcohol with an alkylene oxide, in the presence of monoethanolamine as a catalyst.

10. The process which comprises reacting an alkylene glycol with an alkylene oxide in the presence of an organic aliphatic amine as a catalyst, said amine being also capable of reaction with the alkylene oxide to form higher boiling compounds than the essential product.

11. The process which comprises reacting an alkylene glycol with an alkylene oxide in the presence of an organic aliphatic primary amine as a catalyst, said amine being also capable of reaction with the alkylene oxide to form higher boiling compounds than the essential product.

12. The process which comprises reacting an alkylene glycol with an alkylene oxide in the presence of an ethanolamine as a catalyst.

13. The process which comprises reacting an alkylene glycol with an alkylene oxide in the presence of monoethanolamine as a catalyst.

14. The process which comprises reacting a monoalkyl ether of an alkylene glycol with an alkylene oxide in the presence of an organic aliphatic amine as a catalyst, said amine being also capable of reaction with the alkylene oxide to form higher boiling compounds than the essential product.

15. The process which comprises reacting a monoalkyl ether of an alkylene glycol with an alkylene oxide in the presence of an organic aliphatic primary amine as a catalyst, said amine being also capable of reaction with the alkylene oxide to form higher boiling compounds than the essential product.

16. The process which comprises reacting a monoalkyl ether of an alkylene glycol with an alkylene oxide in the presence of an ethanolamine as a catalyst.

17. The process which comprises reacting a monoalkyl ether of an alkylene glycol with an alkylene oxide in the presence of monoethanolamine as a catalyst.

HARVEY R. FIFE.